July 4, 1939.　　　R. E. SCHREIBER　　　2,164,949
LINE SECURING DEVICE
Filed Jan. 31, 1938
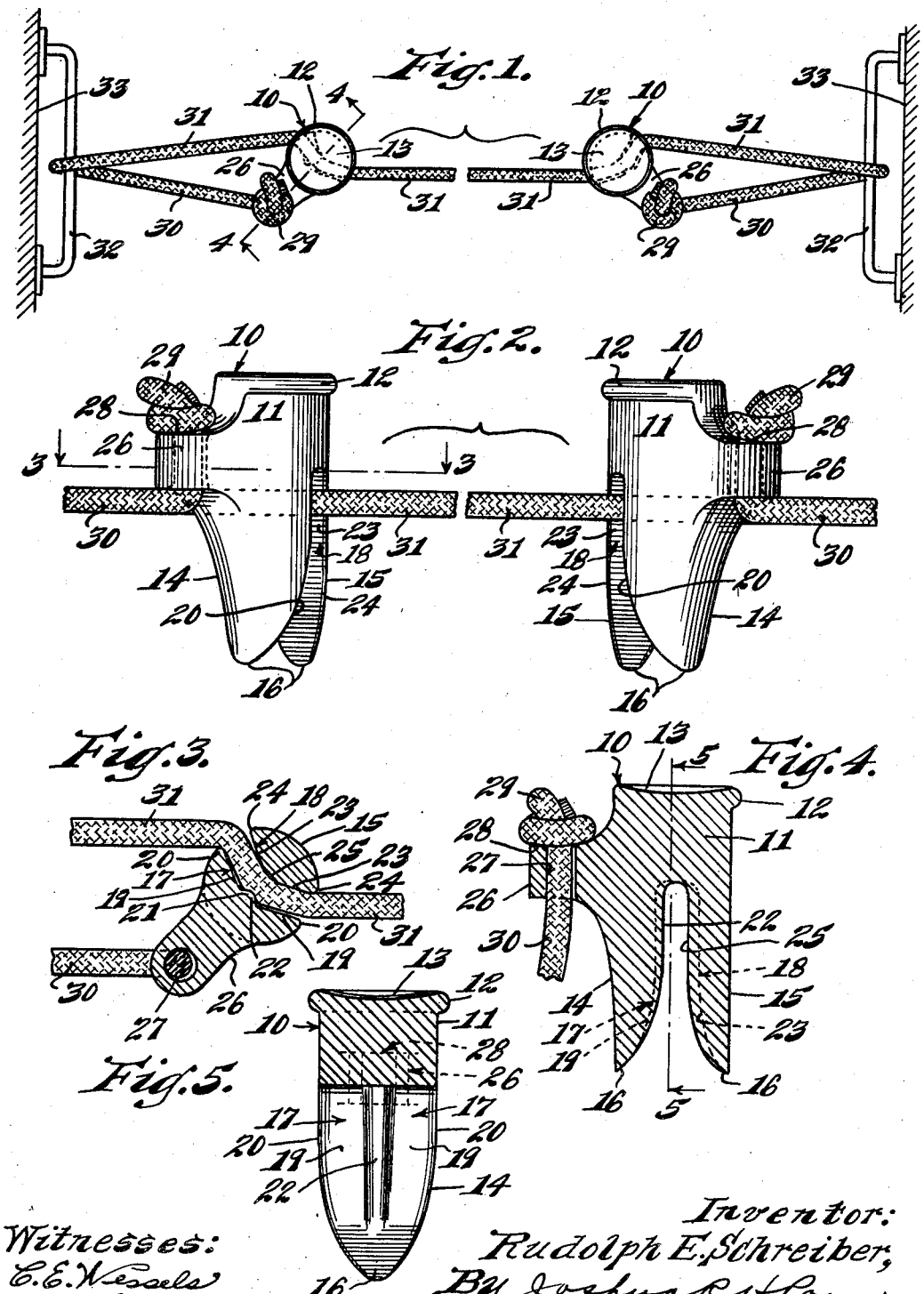
Witnesses:
E. E. Wessels
Aneta E. Matsen
Inventor:
Rudolph E. Schreiber,
By Joshua R. H. Potts
his Attorney.

Patented July 4, 1939

2,164,949

UNITED STATES PATENT OFFICE 2,164,949

LINE SECURING DEVICE

Rudolph E. Schreiber, Chicago, Ill.

Application January 31, 1938, Serial No. 187,909

4 Claims. (Cl. 24—129)

This invention relates to line securing devices and more particularly to such devices for securing the ends of clotheslines and the like.

An object of the invention is to provide a simple, practical, and inexpensive device of the character described.

Another object is to provide a device of the character described adapted for adjustably securing the end of a cord about a hook or rod.

Another object is to provide a device of the character described adapted for a non-slip hitch for securing the end of a cord to an anchoring member. Other objects and advantages will appear and be brought out more fully in the following specification, reference being had to the accompanying drawing, wherein, Fig. 1 is a plan view illustrating the invention in use attached to a cord or line;

Fig. 2 is a fragmentary view enlarged in elevation of the same;

Fig. 3 is a sectional view taken along the line 3—3 of Fig. 2;

Fig. 4 is an enlarged sectional view taken along the line 4—4 of Fig. 1; and

Fig. 5 is a sectional view taken along the line 5—5 of Fig. 4.

Referring more particularly to the drawing, I show a device embodying my invention which essentially comprises a pin 10 having a shank 11, a flattened head 12 having a concave portion 13, the lower portion of the pin being slotted or bifurcated to form an obtuse-angled bend and spaced legs 14 and 15 which terminate in flattened and rounded end portions 16. The legs 14 and 15 have mutually opposed linear contact surfaces 17 and 18, respectively, surface 17 having flattened portions 19 and corner edges 20, flattened portions 19 being inclined toward each other forming an angle 21, there being a bead 22 substantially in the apex of the angle. Similarly, contact surface 18 has a pair of flattened portions 23 and corner edges 24, the flattened portions 23 forming an angle 25 substantially similar to or mating with angle 21.

An ear 26 is formed on leg 14 at the side provided and in line with the bead 22 or bend of the angular slot in the shank of the pin and has an upwardly extending or vertical aperture 27 and the top forms a shoulder 28 adapted for engagement with a knot 29 of an end portion of a line 30, which extends through aperture 27, the intermediate portion of the line being indicated at 31 and which may be secured to and supported by a bracket 32 secured to a wall 33 or in other equivalent manner. The ends of the line 31 are similarly secured and similarly designated. It should also be noted that the apertured ear 26 receives the end portion 30 of the line from the bottom, at which point it is bent to engage the bracket 32 and line portion 31 engages the pin in substantially the same horizontal plane or in alignment with the portion 30, thus securely gripping the line and preventing the pin from canting, tilting, or getting loose.

The operation of the invention should be apparent from the foregoing description. The device is applied to the line portion 31 much the same as a clothespin would be, the line end 30, secured to pin 10 by apertured ear 26, being first given considerable tension. This tension will cause the end to assume approximately the position indicated in Figs. 1 and 3, and the line portion 31 engaged by the slot will be securely held therein against slipping by the pressure on the line at the angles 21 and 25 and bead 22, as well as by the pressure against the line by the alternately or diagonally opposite edges 20 and 24, as will be manifest. It will thus be clear that the line unit as illustrated in Fig. 1 can be readily secured in a simple manner by the supports such as brackets 32, even though considerable variation may be found between the supports selected.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A line securing device comprising a body having a shank provided with an obtuse-angled kerf extending from one end and forming spaced legs, the inner wall of one leg being provided with a recess with a centrally projecting bead in line with the axis of the body and shank and running longitudinally of the leg opposite the meeting line of the sides of the angle of the other leg, the opposed inner wall of the other leg being generally convexed, and an apertured ear on one leg in line with the bead to secure the end of a line and the bead impinging on another portion of the line extending angularly through the kerf to anchor the device on the line.

2. A device of the character described comprising a head, a shank and an apertured ear formed thereon near the head adapted to secure the end of a cord, said shank having a slot therein forming legs with opposed walls adapted to secure said cord therein, said slot having a bend and one wall of said slot having a bead therein opposite the bend in the other wall.

3. A device of the class described comprising a body having a shank provided with an obtuse angled slot extending from one end and forming spaced legs, the inner wall of one leg having a recess and the other an apex, the recessed leg having a centrally projecting bead in line with the axis of the body and shank running longitudinally of the leg opposite the apex of the other leg.

4. A device of the class described comprising a body having a shank provided with an obtuse angled slot extending from one end and forming spaced legs one having a longitudinal recess and the other an apex, the inner wall of the leg provided with the recess having a centrally projecting bead in line with the axis of the body and shank running longitudinally of the leg opposite the apex of the other leg, and an apertured ear on one leg on a diametrical line bisecting the angular slot with the aperture thereof running in the same direction as the length of the slot and the axis of the body and shank.

RUDOLPH E. SCHREIBER.